US012675340B2

(12) United States Patent
Li

(10) Patent No.: US 12,675,340 B2
(45) Date of Patent: Jul. 7, 2026

(54) FUNCTION NODE MIGRATION METHOD AND RELATED DEVICE

(71) Applicant: Huawei Cloud Computing Technologies Co., Ltd., Guizhou (CN)

(72) Inventor: Xiang Li, Hangzhou (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 548 days.

(21) Appl. No.: 17/846,345

(22) Filed: Jun. 22, 2022

(65) Prior Publication Data

US 2022/0318072 A1 Oct. 6, 2022

Related U.S. Application Data

(63) Continuation of application No. PCT/CN2020/137626, filed on Dec. 18, 2020.

(30) Foreign Application Priority Data

Dec. 23, 2019 (CN) .......................... 201911342297.9

(51) Int. Cl.
*G06F 9/455* (2018.01)
*G06F 9/48* (2006.01)
(Continued)

(52) U.S. Cl.
CPC ............ *G06F 9/5088* (2013.01); *G06F 9/455* (2013.01); *G06F 9/45558* (2013.01); *G06F 9/48* (2013.01);
(Continued)

(58) Field of Classification Search
CPC ................. G06F 9/455; G06F 9/45558; G06F 2009/4557; G06F 9/48; G06F 9/4806;
(Continued)

(56) References Cited

U.S. PATENT DOCUMENTS 9,736,046 B1 * 8/2017 Jain ..................... H04L 43/0823
2012/0011254 A1 * 1/2012 Jamjoom .............. G06F 9/4856
709/226
(Continued)

FOREIGN PATENT DOCUMENTS

CN 102790793 A 11/2012
CN 104166594 A 11/2014
(Continued)

*Primary Examiner* — Charles M Swift
(74) *Attorney, Agent, or Firm* — Conley Rose, P.C.

(57) ABSTRACT

A function node migration method includes obtaining access related information of at least one call chain, where the access related information includes at least one of the following information: a delay of each of N intervals included in the at least one call chain, and a quantity of interaction times between function nodes in each of the N intervals, where N is a positive integer greater than or equal to 1; determining, based on the access related information, P key nodes from a plurality of function nodes that form the N intervals; and migrating the P key nodes. Accordingly, a to-be-migrated function node is determined based on actual data of the call chain. Therefore, the to-be-migrated function node meets a migration requirement.

20 Claims, 4 Drawing Sheets

A management device obtains access related information corresponding to X call chains ⟩ 301

The management device determines P key nodes from Y function nodes on the X call chains based on the access related information ⟩ 302

The management device may migrate the P key nodes ⟩ 303

(51) Int. Cl.
  *G06F 9/50* (2006.01)
  *H04L 67/10* (2022.01)
  *H04L 67/60* (2022.01)

(52) U.S. Cl.
  CPC .......... *G06F 9/4806* (2013.01); *G06F 9/4843* (2013.01); *G06F 9/485* (2013.01); *G06F 9/4856* (2013.01); *G06F 9/50* (2013.01); *G06F 9/5077* (2013.01); *G06F 9/5083* (2013.01); *H04L 67/10* (2013.01); *H04L 67/60* (2022.05); *G06F 2009/4557* (2013.01)

(58) Field of Classification Search
  CPC ...... G06F 9/4843; G06F 9/485; G06F 9/4856; G06F 9/50; G06F 9/5077; G06F 9/5083; G06F 9/5088; H04L 67/10; H04L 67/60
  See application file for complete search history.

(56) References Cited

U.S. PATENT DOCUMENTS

| | | | |
|---|---|---|---|
| 2013/0182622 A1* | 7/2013 | Lin .................... H04W 52/025 370/311 |
| 2014/0196041 A1* | 7/2014 | Takamura ............. G06F 9/5088 718/1 |

| | | | |
|---|---|---|---|
| 2015/0039764 A1 | 2/2015 | Beloglazov et al. | |
| 2015/0326658 A1* | 11/2015 | Mitsunobu ........... G06F 9/4856 718/1 | |
| 2015/0350037 A1* | 12/2015 | Minamino ........... H04L 43/087 709/224 | |
| 2017/0277572 A1 | 9/2017 | Suit | |
| 2017/0300353 A1 | 10/2017 | Yu et al. | |
| 2017/0329650 A1 | 11/2017 | Yokota | |
| 2019/0235903 A1* | 8/2019 | Singh ................. G06F 9/45558 | |
| 2020/0089516 A1* | 3/2020 | Vijayvargiya ...... H04L 41/0813 | |

FOREIGN PATENT DOCUMENTS

| | | |
|---|---|---|
| CN | 104518993 A | 4/2015 |
| CN | 106330576 A | 1/2017 |
| CN | 107147696 A | 9/2017 |
| CN | 107919986 A | 4/2018 |
| CN | 108540405 A | 9/2018 |
| CN | 109995813 A | 7/2019 |
| CN | 110213351 A | 9/2019 |
| WO | 2018000991 A1 | 1/2018 |

* cited by examiner

FUNCTION NODE MIGRATION METHOD AND RELATED DEVICE

CROSS-REFERENCE TO RELATED APPLICATIONS

This is a continuation of International Patent Application No. PCT/CN2020/137626 filed on Dec. 18, 2020, which claims priority to Chinese Patent Application No. 201911342297.9 filed on Dec. 23, 2019. The disclosures of the aforementioned applications are hereby incorporated by reference in their entireties.

TECHNICAL FIELD

This disclosure relates to the field of information technology, in particular to a function node migration method and a related device.

BACKGROUND

In a distributed system, a service function has one or more service requests. Each of the one or more service requests corresponds to one call chain. The call chain is used to process the corresponding service request. The call chain requires collaboration of a plurality of function nodes to process the service request. For example, the service request is first sent to a function node A. After processing the service request, the function node A sends a processing result to a function node B. The function node B processes the processing result from the function node A, and sends another processing result to a function node C. The function node C processes the processing result from the function node B, and the collaboration continues.

A function node can be migrated between different servers. Currently, a function node migration method is determined based on a prediction. For example, a server resource occupied by the function node may be predicted based on collected data (for example, usage of a central processing unit (CPU) or memory usage). If a prediction result exceeds a preset threshold, one or more function nodes are migrated to an idle server. However, the prediction result in this manner may be different from that in an actual situation, and an unnecessary migration may be caused.

SUMMARY

This disclosure provides a function node migration method and a related device, so that a function node can be migrated based on an actual requirement.

Embodiments of this disclosure provide a function node migration method, and the method includes: obtaining access related information of at least one call chain, where the access related information includes at least one of the following information: a delay of each of N intervals included in the at least one call chain, and a quantity of interaction times between function nodes in each of the N intervals, where N is a positive integer greater than or equal to 1; determining, based on the access related information, P key nodes from a plurality of function nodes that form the N intervals; and migrating the P key nodes, where P is a positive integer greater than or equal to 1.

In the foregoing technical solution, a to-be-migrated function node is determined based on actual data of the call chain. Therefore, the to-be-migrated function node determined in the foregoing technical solution meets a migration requirement. Therefore, in the foregoing technical solution, the to-be-migrated function node can be determined based on an actual requirement, which reduces unnecessary migration.

With reference to a first aspect, in a possible implementation of the first aspect, when the access related information includes the delay of each of the N intervals and the quantity of interaction times between function nodes in each of the N intervals, the determining P key nodes from a plurality of function nodes that form the N intervals based on the access related information includes: determining N migration degrees based on the access related information, where the N migration degrees are in a one-to-one correspondence with the N intervals, and the migration degree is positively correlated with the delay and the quantity of interaction times; determining M intervals from the N intervals based on the N migration degrees, where a migration degree of any interval in the M intervals is greater than a migration degree of any interval in the N intervals other than the M intervals; and determining the P key nodes, where the P key nodes belong to the M intervals.

The migration degree in the foregoing technical solution is determined based on the delay and the quantity of interaction times. A larger delay of an interval (weight) indicates a larger quantity of interaction times between nodes and a higher migration degree in the interval. A function node in an interval with a high migration degree may be used as a to-be-migrated source node. The function node determined according to the foregoing technical solution is a common function node with a high delay. These function nodes are migrated to reduce a delay, which significantly improves user experience.

With reference to the first aspect, in a possible implementation of the first aspect, the determining N migration degrees based on access related information includes: determining a weight $W_{ij}$ corresponding to a delay of an $N_{ij}$th interval in the N intervals, where the $N_{ij}$th interval is a jth interval of an ith call chain in the at least one call chain, and i and j are positive integers greater than or equal to 1, and $N_{ij}=1, 2, \ldots$, or N; and determining an Nth migration degree in the N migration degrees based on the weight W and a quantity of interaction times between function nodes in the $N_{ij}$th interval.

With reference to the first aspect, in a possible implementation of the first aspect, the migrating the P key nodes includes: determining a destination server from a plurality of servers; and determining whether the destination server meets a migration requirement of an xth key node in the P key nodes, where $x=1, \ldots$, or P, where if the destination server meets the migration requirement of the xth key node, migrating the xth key node to the destination server; or if the destination server does not meet the migration requirement of the xth key node, determining another destination server from the plurality of servers.

The foregoing technical solution can prevent a to-be-migrated function node from being migrated to a server that cannot run the function node.

With reference to the first aspect, in a possible implementation of the first aspect, the determining whether the destination server meets a migration requirement of an xth key node in the P key nodes includes: determining whether a function node running on the destination server is in an anti-affinity relationship with the xth key node, where if the function node running on the destination server is in the anti-affinity relationship with the xth key node, determining that the destination server does not meet the migration requirement of the xth key node; or if the function node running on the destination server is not in the anti-affinity relationship with the xth key node, determining that the destination server meets the migration requirement of the xth key node.

With reference to the first aspect, in a possible implementation of the first aspect, the determining whether the destination server meets a migration requirement of an xth key node in the P key nodes includes: if the hardware information of the xth key node conflicts with the hardware information of the destination server, determining that the destination server does not meet the migration requirement of the xth key node; or if the hardware information of the xth key node does not conflict with the hardware information of the destination server, determining that the destination server meets the migration requirement of the xth key node.

With reference to the first aspect, in a possible implementation of the first aspect, the determining whether the destination server meets a migration requirement of an xth key node in the P key nodes includes: determining whether a computing resource of the destination server meets the migration requirement of the xth key node, where if the computing resource of the destination server does not meet the migration requirement of the xth key node, determining that the destination server does not meet the migration requirement of the xth key node; or if the computing resource of the destination server meets the migration requirement of the xth key node, determining that the destination server meets the migration requirement of the xth key node.

With reference to the first aspect, in a possible implementation of the first aspect, the destination server is a server on which the reference function node corresponding to the xth key node is located, or a server adjacent to a server on which the reference function node is located, where the reference function node and the xth key node are two function nodes in one of the M intervals.

The destination server determined based on the foregoing technical solution can reduce a delay between the key node and the reference function node, thereby improving user experience.

With reference to the first aspect, in a possible implementation of the first aspect, the method further includes: determining a topology diagram based on the N migration degrees and a connection relationship between the N intervals, where the topology diagram represents the connection relationship between the N intervals and a migration degree corresponding to each of the N intervals.

The foregoing technical solution facilitates graph analysis and visualization of the call chain information.

According to a second aspect, an embodiment of this disclosure provides a computer device, where the computer device includes a unit configured to implement any possible implementation of the method design in the first aspect.

According to a third aspect, an embodiment of this disclosure provides a computer device, including a transceiver and a processor. Optionally, the computer device further includes a memory. The processor is configured to control the transceiver to send and receive signals. The memory is configured to store a computer program. The processor is configured to invoke the computer program from the memory and run the computer program, so that the computer device performs the method in any possible implementation of the method design in the first aspect.

According to a fourth aspect, an embodiment of this disclosure provides an electronic apparatus. The electronic apparatus may be a computer device configured to implement the method design in the first aspect, or may be a chip disposed in a computer device. The electronic apparatus includes a processor. The processor is coupled to a memory, and may be configured to execute instructions and/or program code in the memory, to implement the method in any possible implementation of the method design in the first aspect. Optionally, the electronic apparatus further includes a memory. Optionally, the electronic apparatus further includes a communication interface, and the processor is coupled to the communication interface.

When the electronic apparatus is a computer device, the communication interface may be a transceiver or an input/output interface.

When the electronic apparatus is a chip disposed in a computer device, the communication interface may be an input/output interface.

Optionally, the transceiver may be a transceiver circuit. Optionally, the input/output interface may be an input/output circuit.

According to a fifth aspect, an embodiment of this disclosure provides a computer program product. The computer program product includes computer program code. When the computer program code is run on a computer, the computer is enabled to perform the method in any possible implementation of the method design in the first aspect.

According to a sixth aspect, an embodiment of this disclosure provides a computer-readable medium. The computer-readable medium stores program code. When the computer program code is run on a computer, the computer is enabled to perform the method in any possible implementation of the method design in the first aspect.

DESCRIPTION OF EMBODIMENTS

Figure 1:
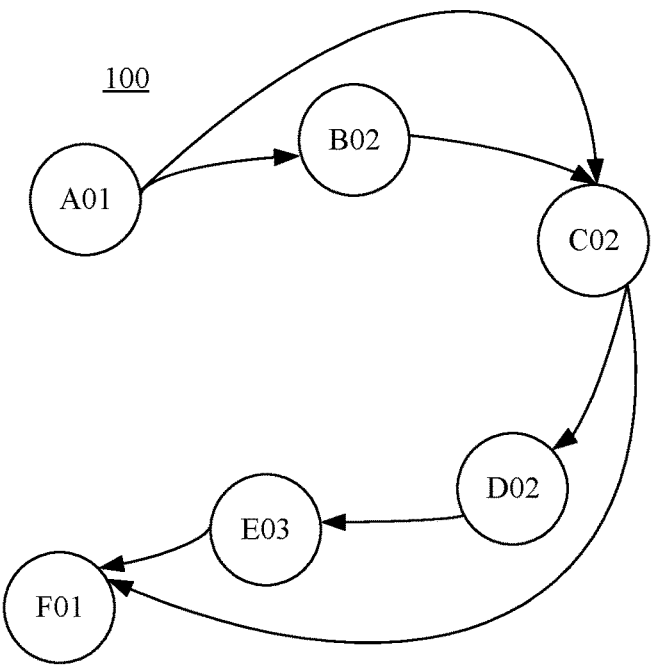
FIG. 1 is a schematic topology diagram of a call chain corresponding to a service request.

The following describes technical solution of this disclosure with reference to the accompanying drawings.

All aspects, embodiments, or features are presented in this disclosure by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may also be used.

In addition, in embodiments of this disclosure, terms such as "for example" and "such as" are used to represent giving an example, an illustration, or description. Any embodiment or design scheme described as an "example" in this disclosure should not be explained as being more preferred or having more advantages than another embodiment or design scheme. The term "example" is used for presenting a concept in a specific manner.

In embodiments of this disclosure, one piece of information, signal, message, or channel may be used sometimes. It should be noted that expressed meanings are consistent when differences are not emphasized. "Relevant" and "corresponding" may be interchangeably used sometimes. It should be noted that meanings expressed by the terms are consistent when differences are not emphasized.

In embodiments of this disclosure, sometimes a subscript such as $W_1$ may be written in an incorrect form such as W1. Expressed meanings are consistent when differences are not emphasized.

A network architecture and a service scenario that are described in embodiments of this disclosure are intended to describe the technical solution in the embodiments of this disclosure more clearly, but constitute no limitation on the technical solutions provided in the embodiments of this disclosure. A person of ordinary skill in the art may know that, with evolution of the network architecture and emergence of new service scenarios, the technical solutions provided in the embodiments of this disclosure are also applicable to similar technical problems.

Reference to "one embodiment" or "some embodiments" described in this specification or the like means that one or more embodiments of this disclosure include a particular feature, structure, or characteristic described in combination with the embodiment. Thus, phrases "in one embodiment", "in some embodiments", "in some other embodiments", "in some additional embodiments", and the like that appear in different parts in this specification do not necessarily mean referring to a same embodiment, but mean "one or more embodiments, but not all embodiments", unless otherwise emphasized. The terms "include", "comprise", "have", and their variants all mean "include but are not limited to", unless otherwise emphasized in other ways.

In this disclosure, "at least one" refers to one or more, and "a plurality of" refers to two or more. "And/or" describes an association relationship between associated objects, and indicates that three relationships may exist. For example, A and/or B may indicate the following three cases: A exists alone, both A and B exist, and B exists alone, where A and B may be singular or plural. A character "/" generally indicates an "or" relationship between the associated objects. "At least one of the following items (pieces)" or a similar expression thereof refers to any combination of these items, including any combination of singular items (pieces) or plural items (pieces). For example, at least one item (piece) of a, b, or c may indicate: a, b, c, a-b, a-c, b-c, or a-b-c, where a, b, and c may be singular or plural.

A function node in embodiments of this disclosure may be a node implemented by using a virtual machine, or may be a node implemented by using a container. This is not limited in this embodiment of this disclosure.

In some embodiments, a function node may be a node in a microservice architecture. In this case, the function node may also be referred to as a microservice node, a microservice module, a microservice application program, or the like. The microservice node may be configured to provide a microservice.

A plurality of function nodes that provide a service function may be all implemented by a virtual machine, or may be all implemented by a container. Alternatively, some function nodes in the plurality of function nodes are implemented by a virtual machine, and the other function nodes are implemented by a container.

Migration refers to the process of moving a virtual machine or container from one server to another. Live migration refers to a migration process that the virtual machine or container is not powered off. Cold migration refers to a migration process that the virtual machine is powered off.

A migration in embodiments of this disclosure may be a live migration or a cold migration. In some embodiments, if a quantity of function nodes to be migrated is greater than or equal to 2, some function nodes in a plurality of function nodes may be migrated through a live migration process, and other function nodes may be migrated through a cold migration process.

FIG. 1 is a schematic topology diagram of a call chain corresponding to a service request. As shown in FIG. 1, a call chain 100 may be provided by six function nodes. The six function nodes are respectively A01, B02, C02, D02, E03, and F01.

A01 refers to a node 01 of a microservice A, B02 refers to a node 02 of a microservice B, and C02 refers to a node 02 of a microservice C. The same rule applies to other nodes.

After receiving a service request, A01 may process the service request, and determine, based on a processing result, to send the processing result to B02 or C02. For ease of description, in the following, a processing result of A01 is referred to as a processing result A, a processing result of B02 is referred to as a processing result B, a processing result of C02 is referred to as a processing result C, and so on.

After receiving the processing result A from A01, B02 continues to process the processing result A to obtain the processing result B, and sends the processing result B to C02.

A processing result received by C02 may be the processing result A from A01 or the processing result B from B02. C02 processes the received processing result to obtain the processing result C. C02 may determine, based on the processing result C, to send the processing result C to D02 or F01.

After receiving the processing result C from C02, D02 processes the processing result C to obtain a processing result D, and sends the processing result D to E03.

After receiving the processing result D from D02, E03 processes the processing result D to obtain a processing result E, and sends the processing result E to F01.

A processing result received by F01 may be the processing result C from C02 or the processing result E from E03. F01 processes the received processing result to obtain a processing result F. The processing result F is a service processing result corresponding to the service request received by A01.

It may be understood that the schematic topology diagram shown in FIG. 1 is merely intended to facilitate understanding of a relationship between function nodes. In an actual implementation process, the schematic topology diagram shown in FIG. 1 may not be generated. Alternatively, a relationship between the function nodes may be shown in another manner. For example, a relationship between a plurality of function nodes configured to provide the service function may be represented in the form of a table, for example, Table 1.

TABLE 1

| Current node | Next hop |
| --- | --- |
| A01 | B02, C02 |
| B02 | C02 |
| C02 | D02, F01 |
| D02 | E03 |
| E03 | F01 |
| F01 | / |

Figure 2:
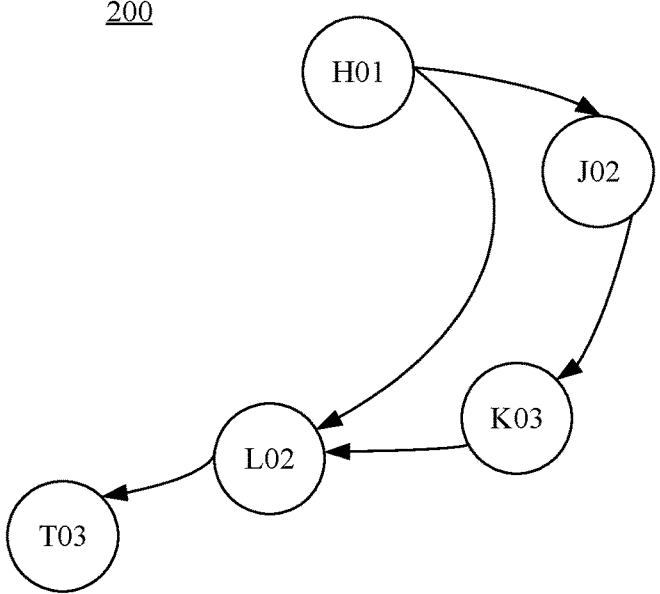
FIG. 2 is a schematic topology diagram of a call chain corresponding to another service request.

FIG. 2 is a schematic topology diagram of a call chain corresponding to another service request. As shown in FIG. 2, the call chain 200 may be provided by five function nodes. The five function nodes are respectively H01, J02, K03, L02, and T03.

H01 refers to a node 01 of a microservice H, and J02 refers to a node 02 of a microservice J. The same rule applies to other nodes.

A manner of processing a service request by a function node in the call chain 200 is similar to a manner of processing a service request by a function node in the call chain 100. For brevity, details are not described herein again.

Figure 3:
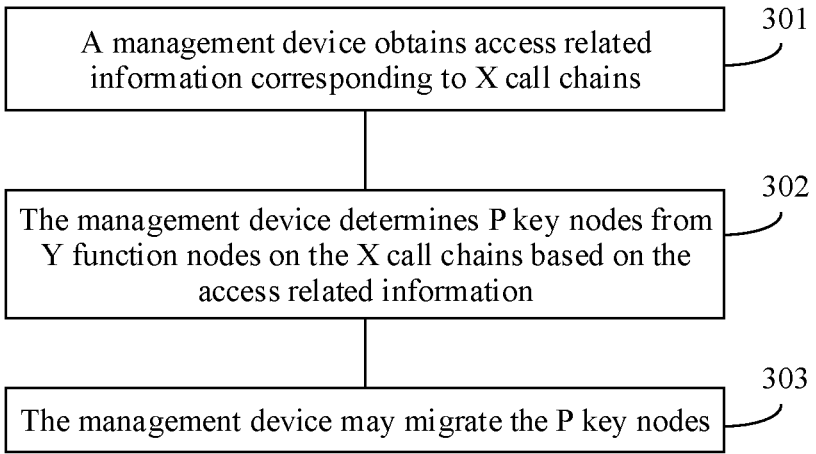
FIG. 3 is a schematic flowchart of a function node migration method according to an embodiment of this disclosure.

FIG. 3 is a schematic flowchart of a function node migration method according to an embodiment of this disclosure. A method shown in FIG. 3 may be performed by a management device, or may be performed by a component (for example, a chip or a circuit) in the management device. The management device may be a computer device, for example, a server, a desk computer, a notebook computer, or a tablet. For ease of description, when FIG. 3 is described, it is assumed that the method shown in FIG. 3 is implemented by a management device. FIG. 3 describes the technical solution of this disclosure in detail with reference to the call chain 100 and the call chain 200.

Step 301: The management device obtains access related information corresponding to X call chains, where X is a positive integer greater than or equal to 1.

The X service requests corresponding to the X call chains may belong to a same service function, or may belong to different service functions. The X service requests corresponding to the X call chains may be all service requests or some service requests included in one service function. This is not limited in embodiments of this disclosure.

Optionally, in some embodiments, the management device may determine, based on access traffic of a user, the call chain that needs to migrate a function node.

For example, in some embodiments, the management device may determine access traffic of each of the plurality of call chains. If the access traffic of one or more call chains in the plurality of call chains is greater than a preset traffic threshold, it may be determined that function nodes in the one or more call chains need to be migrated.

For another example, in some other embodiments, the management device may rank a plurality of call chains in descending order of access traffic, and determine to migrate function nodes in one or more top-ranked call chains.

Optionally, in some other embodiments, the management device may determine, based on a total delay of the call chain, the call chain that needs to migrate the function nodes.

For example, in some embodiments, the management device may determine the total delay of each of the plurality of call chains. If the total delay of one or more call chains in the plurality of call chains is greater than a preset delay threshold, it may be determined that function nodes in the one or more call chains need to be migrated.

For another example, in some other embodiments, the management device may rank a plurality of call chains in descending order of total delay, and determine to migrate function nodes in one or more top-ranked call chains.

Optionally, in some other embodiments, the management device may determine, based on a quantity of use times of a call chain, the call chain that needs to migrate the function nodes.

For example, in some embodiments, the management device may determine the quantity of use times of each of the plurality of call chains. If the quantity of use times of one or more call chains in the plurality of call chains is greater than a preset quantity threshold of use times, it may be determined that function nodes in the one or more call chains need to be migrated.

For another example, in some other embodiments, the management device may rank a plurality of call chains in descending order of the quantity of use times, and determine to migrate function nodes in one or more top-ranked call chains.

Optionally, in some other embodiments, the management device may determine, based on any two or all of the access traffic of the user, the total delay of the call chains, and the quantity of access times of the call chains, a call chain that needs to migrate the function nodes.

For example, the management device may rank a plurality of call chains whose access traffic is greater than a preset traffic threshold in descending order of total delay, and migrate the function nodes in one or more top-ranked call chains.

For ease of description, the following assumes that the management device in step 301 obtains the access related information of the call chain 100 and the call chain 200 shown in FIG. 1.

In some embodiments, the access related information corresponding to the X call chains may include at least one piece of the following information: the delay of each of the plurality of intervals included in the X call chains, and the quantity of interaction times between function nodes in each of the plurality of intervals.

The interval included in the call chain is the interval between function nodes of the call chain 100. For ease of description, in the following, an interval between A01 and B02 is referred to as an interval A-B, an interval between B02 and C02 is referred to as an interval B-C, an interval between A01 and C02 is referred to as an interval A-C, and so on. The call chain 100 includes an interval A-B, an interval A-C, an interval B-C, an interval C-D, an interval C-F, an interval D-E, and an interval E-F. The call chain 200 includes an interval H-J, an interval H-L, an interval J-K, an interval K-L, and an interval L-T.

The quantity of interaction times between function nodes in each interval is the quantity of interaction times between two function nodes forming one interval. Taking the interval A-B as an example, if A01 sends a processing result 1 to B02, it indicates that the quantity of interaction times between the function nodes in the interval A-B increases by 1.

In some embodiments, the quantity of interaction times between the function nodes may be a sum of the quantity of interaction times after the service function is enabled.

In some other embodiments, the quantity of interaction times between the function nodes may be an average quantity of interaction times in a plurality of statistical periods. For example, the management device may periodically collect statistics of the quantity of interaction times between function nodes in each interval within a predetermined time interval, and the average quantity of interaction times in the plurality of statistical periods may be used as the quantity of interaction times between the function nodes.

In some other embodiments, the management device may periodically collect statistics of the quantity of interaction times between function nodes in each interval within a predetermined time interval. The quantity of interaction times between the function nodes may be the quantity of interaction times within the predetermined interval, whose statistics is most recently collected by the management device.

The access related information corresponding to the call chain 100 may be shown in Table 2.

TABLE 2

| Interval | Delay | Quantity of interaction times |
|---|---|---|
| Interval | $D_{AB}$ | $N_{AB}$ |
| Interval A-C | $D_{AC}$ | $N_{AC}$ |
| Interval B-C | $D_{BC}$ | $N_{BC}$ |
| Interval C-D | $D_{CD}$ | $N_{CD}$ |
| Interval C-F | $D_{CF}$ | $N_{CF}$ |
| Interval D-E | $D_{DE}$ | $N_{DE}$ |
| Interval E-F | $D_{EF}$ | $N_{EF}$ |

In Table 2, $D_{AB}$ refers to a delay of an interval A-B, DAC refers to a delay of an interval A-C, and so on. The values of $D_{AB}$, $D_{AC}$, $D_{BC}$, $D_{CD}$, $D_{CF}$, $D_{DE}$, and $D_{EF}$ are greater than 0. In Table 2, $N_{AB}$ refers to a quantity of interaction times between function nodes in an interval A-B, $N_{AC}$ refers to a quantity of interaction times between function nodes in an interval A-C, and so on. The $N_{AB}$, $N_{AC}$, $N_{BC}$, $N_{CD}$, $N_{CF}$, $N_{DE}$, and $N_{EF}$ are integers greater than or equal to 0.

The access related information corresponding to the call chain 200 may be shown in Table 3.

TABLE 3

| Interval | Delay | Quantity of interaction times |
|---|---|---|
| Interval H-J | $D_{HJ}$ | $N_{HJ}$ |
| Interval J-K | $D_{JK}$ | $N_{JK}$ |
| Interval K-L | $D_{KL}$ | $N_{KL}$ |
| Interval H-L | $D_{HL}$ | $N_{HL}$ |
| Interval L-T | $D_{LT}$ | $N_{LT}$ |

In Table 3, $D_{HJ}$ refers to a delay of an interval H-J, $D_{JK}$ refers to a delay of an interval J-K, and so on. The values of $D_{HJ}$, $D_{JK}$, $D_{KL}$, $D_{HL}$, and $D_{LT}$ are greater than 0. In Table 3, $N_{HJ}$ refers to a quantity of interaction times between function nodes in an interval H-J, $N_{JK}$ refers to a quantity of interaction times between function nodes in an interval J-K, and so on. The $N_{HJ}$, $N_{JK}$, $N_{KL}$, $N_{HL}$, and $N_{LT}$ are integers greater than or equal to 0.

Step 302: The management device determines P key nodes from Y function nodes on the X call chains based on the access related information, where P is a positive integer greater than or equal to 1.

Taking the call chain 100 shown in FIG. 1 and the call chain 200 shown in FIG. 2 as an example, the management device may first determine, based on the access related information, one or more intervals that meet the preset condition from the twelve intervals, and then determine the P key nodes from the one or more intervals. For ease of description, an interval that meets a preset condition is referred to as a target interval below.

In some embodiments, the access related information corresponding to the call chain 100 and the call chain 200 may include only a delay of an interval. In this case, the management device may determine the target interval based on the delay of the interval.

In some embodiments, the management device may sort the 12 intervals in descending order of delays of the intervals, and determine the top $K_1$ intervals as the target interval. $K_1$ is a positive integer greater than or equal to 1 and less than 12.

For example, it is assumed that $K_1$ is 2, and that $D_{AB}>D_{AC}>D_{BC}>D_{CD}>D_{CF}>D_{DE}>D_{EF}>D_{HJ}>D_{JK}>D_{KL}>D_{HL}>D_{LT}$. In this case, the management device may determine the interval A-B and the interval A-C as the target intervals. If a quantity of intervals with a maximum delay exceeds the predetermined quantity, the management device may determine any two intervals as the target intervals. It is assumed that $D_{AB}>D_{AC}=D_{BC}=D_{CD}=D_{CF}>D_{DE}>D_{EF}>D_{HJ}>D_{JK}>D_{KL}>D_{HL}>D_{LT}$. Interval. In this case, the management device may determine the interval A-B and the interval B-C as the target intervals. It is assumed that $D_{AB}=D_{AC}=D_{BC}=D_{CD}>D_{CF}>D_{DE}>D_{EF}>D_{HJ}>D_{JK}>D_{KL}>D_{HL}>D_{LT}$. In this case, the management device may determine the interval A-C and the interval B-C as the target intervals.

In some other embodiments, the management device may determine an interval in which a delay exceeds the delay threshold in the 12 intervals as the target interval.

In some other embodiments, the access related information corresponding to the call chain 100 and the call chain 200 may only include the quantity of interaction times between nodes. In this case, the management device may determine the target interval based on the quantity of interaction times between function nodes.

For example, in some embodiments, the management device may sort the 12 intervals in descending order of the quantity of interaction times between nodes in the intervals, and determine the top $K_2$ intervals as the target interval. $K_2$ is a positive integer greater than or equal to 1 and less than 12.

For example, it is assumed that $K_2$ is 2, and that $N_{AB}>N_{AC}>N_{BC}>N_{CD}>N_{CF}>N_{DE}>N_{EF}>N_{HJ}>N_{JK}>N_{KL}>N_{HL}>N_{LT}$. In this case, the management device may determine the interval A-B and the interval A-C as the target intervals. If a quantity of intervals with a maximum quantity of interaction times between nodes exceeds the predetermined quantity, the management device may determine any two intervals as the target intervals. It is assumed that $N_{AB}>N_{AC}=N_{BC}=N_{CD}=N_{CF}=N_{DE}>N_{EF}>N_{HJ}>N_{JK}>N_{KL}>N_{HL}>N_{LT}$. In this case, the management device may determine the interval A-B and the interval B-C as the target intervals. It is assumed that $N_{AB}=N_{AC}=N_{BC}=N_{CD}=N_{CF}>N_{DE}>N_{EF}>N_{HJ}>N_{JK}>N_{KL}>N_{HL}>N_{LT}$. In this case, the management device may determine the interval A-C and the interval B-C as the target intervals.

For another example, in some other embodiments, the management device may determine an interval in which the quantity of interaction times exceeds the quantity threshold of interaction times in the 12 intervals as the target interval.

In some other embodiments, the access related information corresponding to the call chain 100 and the call chain 200 may include the delay of the interval and the quantity of interaction times between nodes. In this case, the management device may determine the target interval based on the delay of the interval and the quantity of interaction times between nodes.

In some embodiments, that the management device may determine the target interval based on the delay of the interval and the quantity of interaction times between function nodes in the interval includes: the management device may determine a plurality of migration degrees based on the delay of the interval and the quantity of interaction times between function nodes in the interval, where the plurality of migration degrees is in a one-to-one correspondence with the plurality of intervals; and the management device may determine the target interval based on the determined migration degree.

Taking the call chain 100 and the call chain 200 as an example, the management device may determine twelve migration degrees, and the twelve migration degrees are in a one-to-one correspondence with the twelve intervals. The twelve migration degrees may be respectively referred to as a migration degree A-B, a migration degree A-C, a migration degree B-C, a migration degree C-D, a migration degree C-F, a migration degree D-E, a migration degree E-F, a migration degree H-J, a migration degree J-K, a migration degree K-L, a migration degree H-L, and a migration degree L-T, where the migration degree A-B corresponds to an interval A-B, the migration degree A-C corresponds to an interval A-C, and so on.

A migration degree corresponding to an interval can be determined based on the delay of the interval and the quantity of interaction times between function nodes in the interval. The migration degree corresponding to the interval is positively correlated with the delay of the interval and the quantity of interaction times between function nodes in the interval. In other words, if a delay of an interval and/or a quantity of interaction times between function nodes in the interval increases, a migration degree corresponding to the interval also correspondingly increases.

In some embodiments, a weight corresponding to a delay $D_{AB}$ may be first determined, and then the migration degree A-B is determined based on the weight and the quantity of interaction times.

For example, the migration degree may be equal to a product of a weight and a quantity of interaction times.

For another example, the migration degree may be determined according to the following formula:

$$R_{ab}=W_{ab} \times N_{ab}+c_a+c_b,\qquad \text{(formula 2.1)}$$

$R_{ab}$ refers to a migration degree corresponding to an interval a-b, $W_{ab}$ refers to a weight corresponding to a delay of the interval a-b, $N_{ab}$ refers to a quantity of interaction times between function nodes in the interval a-b, $c_a$ refers to a weight of the function node a, and $c_b$ refers to a weight of the function node b. The weight of the function node a and the weight of the function node b are preset values.

For another example, the migration degree may be determined according to the following formula:

$$R_{ab}=W_{ab} \times W'+N_{ab},\qquad \text{(formula 2.2)}$$

$R_{ab}$ refers to a migration degree corresponding to an interval a-b, $W_{ab}$ refers to a weight corresponding to a delay of the interval a-b, $N_{ab}$ refers to a quantity of interaction times between function nodes in the interval a-b, W' refers to a modified parameter. The modified parameter may be determined based on $N_{ab}$. For example, if $N_{ab}$ is greater than or equal to 100 and less than 1,000, W' may be equal to 100. If $N_{ab}$ is greater than or equal to 1,000 and less than or equal to 9,999, W' may be equal to 1,000.

In some embodiments, the weight of the delay of an interval may be determined based on the correspondence between a delay and a weight. For example, Table 4 shows the correspondence between a delay and a weight.

TABLE 4

| Delay | Weight |
| --- | --- |
| [0, 5 ms) | 0.1 |
| [5, 10 ms) | 0.25 |
| [10, 25 ms) | 0.5 |
| [25, 40 ms) | 0.8 |
| [40, +∞) | 0.9 |

As shown in Table 4, if the delay of an interval is greater than or equal to 0 and less than 5 ms, the weight corresponding to the delay is 0.1; or if the delay of an interval is greater than or equal to 5 ms and less than 10 ms, the weight corresponding to the delay is 0.25.

In some other embodiments, the weight of the delay of an interval may be determined according to the following formula:

$$W_{ab}=D_{ab}/D_{ref}.\qquad \text{(formula 3.1)}$$

$W_{ab}$ refers to a weight corresponding to a delay of an interval a-b, $D_{ab}$ refers to a delay of an interval a-b, and $D_{ref}$ refers to a reference weight. In some embodiments, the reference weight $D_{ref}$ may be a total delay of a call chain in which the interval is located. In some other embodiments, the reference weight $D_{ref}$ may be an average delay of a call chain in which the interval is located. In some other embodiments, the reference weight $D_{ref}$ may be a value determined based on an experiment or statistical data.

In some embodiments, the determining the target interval based on the plurality of migration degrees may include: ranking the plurality of intervals in descending order of migration degrees, and determining $K_3$ intervals with top $K_3$ migration degrees as the target intervals. $K_3$ is a positive integer greater than or equal to 1 and less than 12.

In some other embodiments, the determining the target interval based on the plurality of migration degrees includes: determining an interval whose migration degree is greater than the preset migration degree threshold in the 12 intervals as the target interval.

In some other embodiments, that the management device may determine the target interval based on the delay of the interval and the quantity of interaction times between function nodes in the interval includes: the management device may first rank the plurality of intervals in descending order of delays, and determine top $K_4$ intervals; then, the $K_4$ intervals are ranked in descending order of the quantity of interaction times, and top $K_5$ intervals are determined, where the $K_5$ intervals are the target intervals. $K_4$ is a positive integer greater than or equal to 1 and less than $K_{max}$, $K_5$ is a positive integer greater than or equal to 1 and less than $K_{max}$, $K_4$ is greater than $K_5$, $K_{max}$ is a total quantity of intervals, and $K_{max}$ is a positive integer greater than or equal to 2.

Taking the call chain 100 and the call chain 200 as an example, it is assumed that $K_4$ is equal to 4, and $K_5$ is equal to 2, and that $D_{AB}>D_{AC}>D_{BC}>D_{CD}>D_{CF}>D_{DE}>D_{EF}>D_{HJ}>D_{JK}>D_{KL}>D_{HL}>D_{LT}$, and $N_{AB}<N_{AC}<N_{BC}<N_{CD}<N_{CF}<N_{DE}<N_{EF}<N_{HJ}<N_{JK}<N_{KL}<N_{HL}<N_{LT}$. In this case, the management device may determine the interval B-C and the interval C-D as the target intervals.

In some other embodiments, that the management device may determine the target interval based on the delay of the interval and the quantity of interaction times between function nodes in the interval includes: the management device may first rank the plurality of intervals in descending order of delays, and determine top $K_4$ intervals; then, an interval, in the K4 intervals, in which the quantity of interaction times between serving nodes exceeds the quantity threshold of interaction times is determined as the target interval. $K_4$ is a positive integer greater than or equal to 1 and less than $K_{max}$.

Taking the call chain 100 and the call chain 200 as an example, it is assumed that $K_4$ is equal to 4, and that $D_{AB}>D_{AC}>D_{BC}>D_{CD}>D_{CF}>D_{DE}>D_{EF}>D_{HJ}>D_{JK}>D_{KL}>D_{HL}>D_{LT}$, $N_{AB}<N_{th}<N_{AC}<N_{BC}<N_{CD}<N_{CF}<N_{DE}<N_{EF}<N_{HJ}<N_{JK}<N_{KL}<N_{HL}<N_{LT}$, and $N_{th}$ refers to a quantity threshold of interaction times. In this case, the management device determines the interval A-C, interval B-C, and interval C-D as the target intervals.

In some other embodiments, the management device may only migrate function nodes in $K_x$ intervals. In this case, the management device may sort the plurality of intervals in descending order of delays, and determine the top $K_x$ intervals as the target interval, where $K_x$ is a positive integer greater than or equal to 1.

In some cases, if delays of any two of the plurality of intervals are different, or a quantity of intervals with a largest delay is only $K_x$, the management device may directly determine the $K_x$ intervals each with the largest delay as the target intervals.

Taking the call chain 100 and the call chain 200 as an example, it is assumed that $K_x$ is equal to 2, and $D_{AB}>D_{AC}>D_{BC}>D_{CD}>D_{CF}>D_{DE}>D_{EF}>D_{HJ}>D_{JK}>D_{KL}>D_{HL}>D_{LT}$. In the case, the management device determines the interval A-B and interval A-C as the target intervals.

In some other cases, if $K_x$ is a positive integer greater than 1, delays of a plurality of intervals may be the same, and are all greater than delays of other intervals. In this case, the management device may determine $K_x$ intervals with a largest quantity of interaction times in these intervals with a same delay as the target intervals.

Taking the call chain 100 and the call chain 200 as an example, it is assumed that $K_x$ is equal to 2, and that $D_{AB}=D_{AC}=D_{BC}=D_{CD}>D_{CF}>D_{DE}>D_{EF}>D_{HJ}>D_{JK}>D_{KL}>D_{HL}>D_{LT}$, and $N_{AB}<N_{AC}<N_{BC}<N_{CD}<N_{CF}<N_{DE}<N_{EF}<N_{HJ}<N_{JK}<N_{KL}<N_{HL}<N_{LT}$. In this case, the management device may determine the interval B-C and interval C-D as the target intervals.

After determining the one or more target intervals that meet the preset condition, the management device may determine one or more key nodes from the one or more target intervals.

Optionally, in some embodiments, the management device may determine one function node in each target interval as the key node.

For example, in some embodiments, the key node determined by the management device may be any function node in each interval.

For another example, in some other embodiments, the key node determined by the management device may be a target node in each interval. For example, assuming that the interval A-B is one of the one or more target intervals, the management device may determine that the key node is B02.

For example, in some other embodiments, the key node determined by the management device may be a source node in each interval. For example, assuming that the interval A-B is one of the one or more target intervals, the management device may determine that the key node is A01.

In some embodiments, the management device may determine two function nodes in each target interval as the key nodes.

Step 303: The management device may migrate the P key nodes.

In some embodiments, in a process of migrating the P key nodes, the management device may first determine, from a plurality of servers, one server as a destination server of the key node that needs to be migrated, and then determine whether the destination server meets a migration requirement of the key node, where if the destination server meets the migration requirement of the key node, migrate the key node to the server; or if the destination server does not meet the migration requirement of the key node, determine another server from the plurality of servers as the destination server; and determine whether the other server meets the migration requirement of the key node. If P is a positive integer greater than or equal to 2, destination servers of different key nodes in the P key nodes may be the same, or may be different.

The following uses a first key node as an example to describe how the management device migrates the node. The first key node is any one of the P key nodes.

The first key node has one corresponding function node, and the function node and the first key node form a target interval. For example, assuming that the target interval is an interval A-B, the first key node is A01, and a function node corresponding to the first key node is B02. For another example, assuming that the target interval is an interval B-C, the first key node is C02, and a function node corresponding to the first key node is B02. For ease of description, a function node corresponding to the first key node may be referred to as a first reference node. A server on which the first reference node is located may be referred to as a first candidate server.

In some embodiments, a plurality of servers may be deployed in a same cabinet. A server that is deployed in a same cabinet as the first candidate server may be referred to as a second candidate server. In some embodiments, one first candidate server may have one second candidate server. In some other embodiments, one first candidate server may have a plurality of second candidate servers.

In some embodiments, the plurality of servers may be deployed in a same cabinet. A server that is deployed in a same equipment room as the first candidate server but a different cabinet from the first candidate server may be referred to as a third candidate server. In some embodiments, one first candidate server may have one third candidate server. In some other embodiments, one first candidate server may have a plurality of third candidate servers.

In some embodiments, a data center may have a plurality of cabinets, and one or more servers are deployed in each cabinet. A server that is deployed in a same data center as the first candidate server and a different equipment room from the first candidate server may be referred to as a fourth candidate server.

The second candidate server, the third candidate server, and the fourth candidate server may be referred to as candidate servers adjacent to the first candidate server. In some cases, the candidate servers adjacent to the first candidate server may further include a server that is located in different equipment rooms in a same city or a same area as the first candidate server.

In some embodiments, the management device may further determine from the plurality of servers a server that has a shortest delay from the first candidate server. A server that has a shortest delay from the first candidate server may be referred to as a fifth candidate server. The plurality of servers may have one fifth candidate server or a plurality of fifth candidate servers. In some embodiments, the fifth candidate server may be a same server as one of the second candidate servers, one of the third candidate servers, or one of the fourth candidate servers.

In some embodiments, the management device may determine any one of the plurality of candidate servers as the destination server. If the determined destination server does not meet the migration requirement of the first key node, any one of the remaining candidate servers is determined as the destination server, and so on.

In some other embodiments, the management device may first determine the first candidate server as the destination server. If the first candidate server does not meet the migration requirement of the first key node, a server with a shortest delay from the first candidate server in remaining candidate servers is determined as the destination server, and so on.

In some embodiments, the management device may first determine the first candidate server as the destination server. If the first candidate server does not meet the migration requirement of the first key node, another server that is deployed in a same cabinet as the first candidate server is determined as the destination server. If none of servers that are deployed in the same cabinet as the first candidate server meets the migration requirement of the first key node, or there is only one server in a cabinet in which the first candidate server is located (that is, the first candidate server), another server that is deployed in a same equipment room as the first candidate server is determined as the destination server. If none of servers that are deployed in the same equipment room as the first candidate server meets the migration requirement of the first key node, or there is only one server in an equipment room in which the first candidate server is located (that is, the first candidate server), another server that is deployed in the same data center as the first candidate server is determined as the destination server. In other words, the management device may determine the destination server based on the distance between a server to the first candidate server. If there is a plurality of servers that have a same or similar distance from the first candidate server (for example, servers in a same cabinet or servers in a same equipment room), any one of the plurality of servers may be determined as the destination server.

For example, it is assumed that the first candidate server has two second candidate servers (which may be respectively referred to as a second candidate server 1 and a second candidate server 2) and two third candidate servers (which may be respectively referred to as a third candidate server 1 and a third candidate server 2). For ease of description, the plurality of candidate servers described below include: a first candidate server, a second candidate server 1, a second candidate server 2, a third candidate server 1, and a third candidate server 2.

The management device may first determine the first candidate server as a destination server. If the first candidate server does not meet the migration requirement of the first key node, the management device may determine any one of the second candidate servers (for example, the second candidate server 1) as the destination server. If the second candidate server 1 does not meet the migration requirement of the first key node, the second candidate server 2 is determined as the destination server. If the second candidate server 2 does not meet the migration requirement of the first key node, any one of the third candidate servers is determined as the destination server.

The following uses the first candidate server as an example to describe how to determine whether the server meets the migration requirement of the first key node.

In some embodiments, the management device may determine whether a serving node running on the first candidate server is in an anti-affinity relationship with the first key node. If the function node running on the first candidate server is in the anti-affinity relationship with the first key node, the management device may determine that the first candidate server does not meet the migration requirement of the first key node; if the function node running on the first candidate server is not in the anti-affinity relationship with the first key node, the management device may determine that the first candidate server meets the migration requirement of the first key node.

For example, an active node and a backup node of the database cannot be deployed on a same server. If a backup node is a first key node, the active node and the first key node are in an anti-affinity relationship.

In some embodiments, the management device may store identity information of a node in an anti-affinity relationship with the first key node. Based on the stored information, the management device may determine whether the first candidate server includes the node in the anti-affinity relationship with the first key node. If the first candidate server does not include the function node in the anti-affinity relationship with the first key node, it may be determined that the first candidate server meets the migration requirement of the first key node; if the first candidate server includes the function node in the anti-affinity relationship with the first key node, it may be determined that the first candidate server does not meet the migration requirement of the first key node.

In some other embodiments, the first candidate server may include identity information (hereinafter briefly referred to as "an anti-affinity list" below for ease of description) of a node in an anti-affinity relationship with the function node on the first candidate server. The management device may send the identity information of the first key node to the first candidate server. The first candidate server may determine whether the anti-affinity list includes the identity information of the first key node; if the anti-affinity list does not include the identity information of the first key node, the first candidate server may send a migration affirmance directive to the management device, where the migration affirmance directive is used to indicate that the first candidate server meets the migration requirement of the first key node, or in other words, the migration affirmance directive is used to indicate that the first key node can be migrated to the first candidate server; if the anti-affinity list includes the identity information of the first key node, the first candidate server may send a migration negation directive to the management device, where the migration negation directive is used to indicate that the first candidate server does not meet the migration requirement of the first key node, or in other words, the migration negation directive is used to indicate that the first node cannot be migrated to the first candidate server.

In some other embodiments, the management device may determine, based on hardware information of the first key node, whether the first candidate server meets the migration requirement of the first key node. The management device may determine whether the hardware information of the first key node conflicts with the hardware information of the first candidate server (in other words, determine whether hardware of the first candidate server can run the first key node); if the hardware information of the first key node does not conflict with the hardware information of the first candidate server, it may be determined that the first candidate server meets the migration requirement of the first key node; if the hardware information of the first key node conflicts with the hardware information of the first candidate server, it may be determined that the first candidate server does not meet the migration requirement of the first key node.

The hardware information of the first key node may include any one or more of the following information: information about a CPU that can run the first key node, information about a memory that can run the first key node, information about a GPU that can run the first key node, information about an operating system that can run the first key node, and the like.

For example, it is assumed the CPU that can run the first key node is a CPU of an X86 architecture, but the CPU in the first candidate server is a server of an ARM architecture. In this case, the first candidate server does not meet the migration requirement of the first key node.

In some other embodiments, the management device may determine whether the computing resource of the first candidate server meets the migration requirement of the first key node. The computing resources of the first candidate server may include a CPU resource, a memory resource, a network resource, and the like of the first candidate server. If the computing resource of the first candidate server meets the migration requirement of the first key node, it may be determined that the first candidate server meets the migration requirement of the first key node; if the computing resource of the first candidate server does not meet the migration requirement of the first key node, it may be determined that the first candidate server does not meet the migration requirement of the first key node.

For example, if a CPU usage of the first candidate server exceeds a preset CPU usage threshold, it may be determined that the first candidate server does not meet the migration requirement of the first key node. For another example, if a remaining memory of the first candidate server is less than a preset memory threshold, it may be determined that the first candidate server does not meet the migration requirement of the first key node.

In some other embodiments, the management device may determine, based on affinity information of the first key node, hardware information of the first key node, and the computing resource of the first key node, whether the first candidate server meets the migration requirement of the first key node. It can be determined that the first candidate server meets the migration requirement of the first key node only when the migration requirements of the first key node are met. For example, only when the first candidate server does not include an anti-affinity node of the first key node, hardware of the first candidate server can run the first key node, and a computing resource of the first candidate server can support the first key node, it may be determined that the first candidate server meets the migration requirement of the first key node; otherwise, it may be determined that the first candidate server does not meet the migration requirement of the first key node.

Optionally, in some other embodiments, after P key nodes are determined, an attempt may be first made to migrate the key node to a server. If the key node cannot be migrated to the server, the key node is migrated to another server, and the key node continues to be migrated to a new server until the new server can accept the key node.

Optionally, in some embodiments, after the P key nodes are determined, the migration sequence of the P key nodes may be determined based on the migration degree, the delay, and/or the quantity of interaction times that correspond to an interval in which the P key nodes are located.

Taking the migration degree as an example, the management device may migrate the P key nodes in descending order of migration degrees of the P key nodes. In some embodiments, if migration degrees corresponding to two intervals in which two key nodes are located are the same, one key node may be randomly selected to be preferentially migrated. In some other embodiments, if migration degrees corresponding to two intervals in which two key nodes are located are the same, delays of the two intervals may be determined, and a key node in an interval with a larger delay is preferentially migrated. If delays of the two intervals are also the same, the key node in an interval with a larger quantity of interaction times may be preferentially migrated. If the quantity of interaction times of function nodes in the two intervals are also the same, one of the two key nodes may be randomly migrated first.

Optionally, in some other embodiments, the management device may determine an interval as the target interval, determine the key node in the interval, and migrate the key node. In other words, the management device may migrate a key node without waiting for all key nodes to be determined.

The management device may first determine migration information before migrating the key node. The migration information may include resource usage and/or user-requested traffic of a destination server (the destination server herein is a destination server that does not conflict with the key node). The management device may determine, based on the migration information, to migrate the key node. For example, the management device may predict the resource usage of the destination server based on the current resource usage of the destination server and the resource usage history of the destination server, and determine the resource usage prediction information of the destination server. The management device may further determine the predicted user request traffic based on current user request traffic and historical user request traffic. The management device may determine, based on the resource usage prediction information of the destination server and the predicted user request traffic, an occasion for migrating the key node, and migrate the key node to the destination device on the determined occasion.

In some cases, a management device may determine that a key node cannot be migrated to a destination server. For example, if the management device determines that a resource of the destination server exceeds a preset resource occupation threshold in a future period of time, the management device may determine that the key node cannot be migrated to the destination server. For another example, if the management device determines that the user request traffic always exceeds the request traffic threshold in a future period of time, the management device may determine that the key node cannot be migrated to the destination server. For another example, if the management device may determine, based on the resource usage prediction information of the destination server and the predicted user request traffic, that the time length from the moment at which the key node is to be migrated to the current moment exceeds the preset maximum migration time, the management device may determine that the key node cannot be migrated to the destination server.

In some embodiments, if the management device determines that the key node cannot be migrated to the destination server, the management device may determine another server, and attempt to migrate the key node to the other server.

In some other embodiments, if the management device determines that the key node cannot be migrated to the destination server, the management device may determine not to migrate the key node anymore.

Optionally, in some embodiments, the management device may further record data (which may be referred to as migration data) of the key node in the migration process. For example, the migration data may include information such as identity information of the key node, identity information of the destination server to which the key node is migrated, identity information of the source server of the key node, the migration time, and the migration result (for example, whether the migration is successful and the quantity of migration times).

Optionally, in some embodiments, the management device may further train a planning model based on recorded migration data. The planning model may be used to plan deployment of function nodes of the service function, to determine a server on which each function node is located. The management device may first initialize a parameter of each layer in the initial planning model (that is, assign an initial value to each parameter), and then train the initial planning model by using the training data. The training is not completed until a loss function in the initial planning model converges or all migration data is used for training. The planning model may be some existing machine learning models or deep learning models in the industry, such as, any one of a decision tree (DT), a random forest (RF), logistic regression (LR), a support vector machine (SVM), a convolutional neural network (CNN), a recurrent neural network (RNN), and the like.

Optionally, in some other embodiments, a management device may send recorded migration data to a model training device. The management device may train a planning model based on the migration data. A manner in which the model training device trains the planning model is similar to a training manner in which the management device trains the planning model by itself. For brevity, details are not described herein again.

Optionally, in some embodiments, if a management device fails to migrate a key node to a destination server, the management device may attempt to migrate the key node to the destination server again until the migration is successful or a quantity of migration times reaches a preset maximum quantity of migration times.

Figure 4:
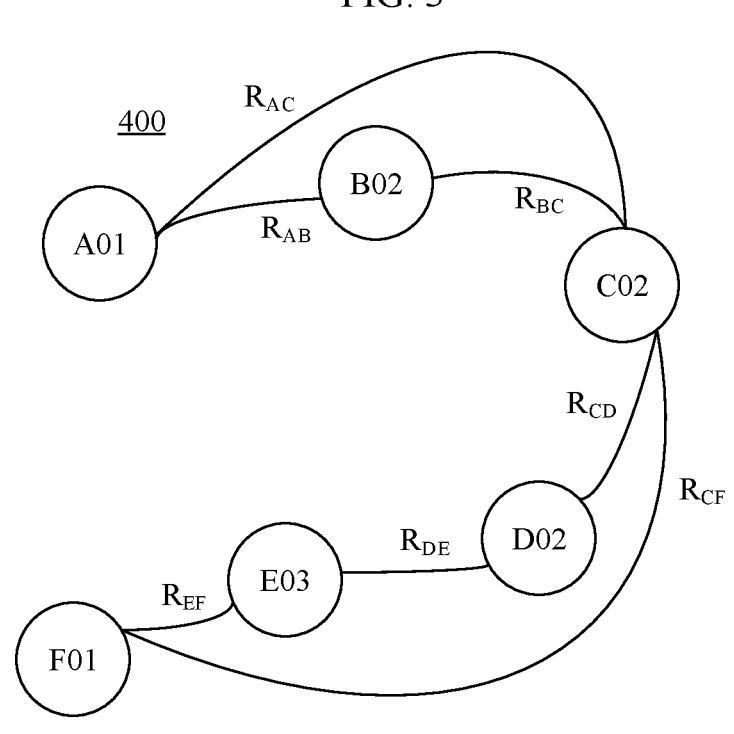
FIG. 4 is a schematic diagram of determining, by a management device, a topology diagram corresponding to a call chain 100.
Figure 5:
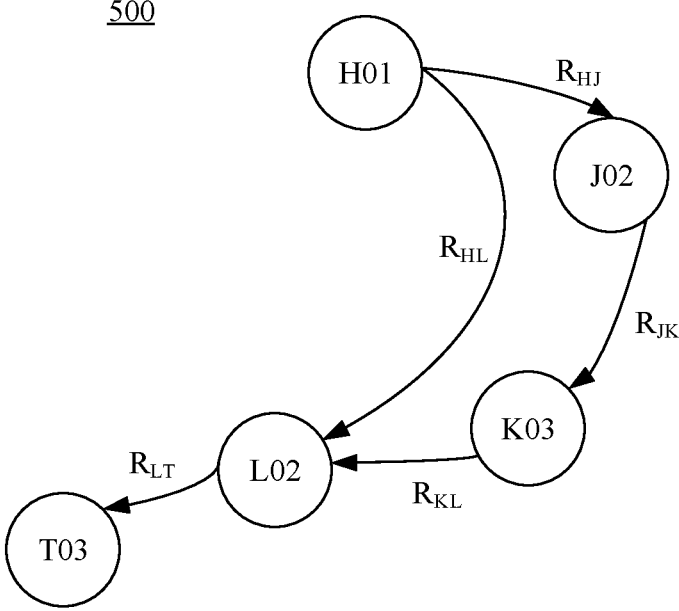
FIG. 5 is a schematic diagram of determining, by a management device, a topology diagram corresponding to a call chain 200.

Optionally, in some embodiments, a management device may determine a topology diagram based on a plurality of migration degrees and a connection relationship between the plurality of intervals, where the topology diagram represents a connection relationship between function nodes in the interval and a migration degree corresponding to each interval. FIG. 4 is a schematic diagram of determining, by a management device, a topology diagram corresponding to call chain 100. The management device may present, by using a display device, a topology diagram 400 shown in FIG. 4. FIG. 5 is a schematic diagram of determining, by a management device, a topology diagram corresponding to a call chain 200. The management device may present, by using a display device, a topology diagram 500 shown in FIG. 5.

Figure 6:
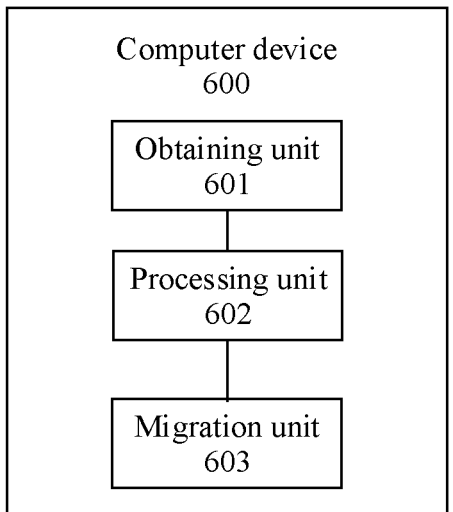
FIG. 6 is a schematic block diagram of a structure of a computer device according to an embodiment of this disclosure.

FIG. 6 is a schematic block diagram of a structure of a computer device according to an embodiment of this disclosure. The computer device 600 shown in FIG. 6 includes an obtaining unit 601, a processing unit 602, and a migration unit 603.

The obtaining unit 601 is configured to obtain access related information of at least one call chain, where the access related information includes at least one of the following information: a delay of each of N intervals included in the at least one call chain, and a quantity of interaction times between function nodes in each of the N intervals, where N is a positive integer greater than or equal to 1.

The processing unit 602 is configured to determine, based on the access related information, P key nodes from a plurality of function nodes that form the N intervals.

The migration unit 603 is configured to migrate the P key nodes, where P is a positive integer greater than or equal to 1.

Optionally, in some embodiments, the processing unit 602 is configured to: when the access related information includes a delay of each of N intervals and a quantity of interaction times between function nodes in each of N intervals, determine, based on the access related information, N migration degrees, where the N migration degrees are in a one-to-one correspondence with the N intervals, and the migration degrees is positively correlated with the delay and the quantity of interaction times; determine, based on the N migration degrees, M intervals from the N intervals, where a migration degree of any interval in the M intervals is greater than a migration degree of any interval in the N intervals other than the M intervals; and determine the P key nodes, where the P key nodes belong to the M intervals.

Optionally, in some embodiments, the processing unit 602 is configured to: determine a weight $W_{ij}$ corresponding to a delay of an $N_{ij}$th interval in the N intervals, where the $N_{ij}$th interval is a jth interval of an ith call chain in the at least one call chain, and i and j are positive integers greater than or equal to 1, and $N_{ij}=1, 2, \ldots,$ or N; and determine an Nth migration degree in the N migration degrees based on the weight $W_{ij}$ and a quantity of interaction times between function nodes in the Nth interval.

Optionally, in some embodiments, the migration unit 603 is configured to: determine a destination server from a plurality of servers; and determine whether the destination server meets the migration requirement of an xth key node in the P key nodes, where $x=1, \ldots,$ or P, where if the destination server meets the migration requirement of the xth key node, migrate the xth key node to the destination server; or if the destination server does not meet the migration requirement of the xth key node, determine another destination server from the plurality of servers.

Optionally, in some embodiments, the migration unit 603 is configured to: determine whether a function node running on the destination server is in an anti-affinity relationship with the xth key node, where if the function node running on the destination server is in the anti-affinity relationship with the xth key node, determine that the destination server does not meet the migration requirement of the xth key node; or if the function node running on the destination server is not in the anti-affinity relationship with the xth key node, determine that the destination server meets the migration requirement of the xth key node.

Optionally, in some embodiments, the migration unit 603 is configured to: if the hardware information of the xth key node conflicts with the hardware information of the destination server, determine that the destination server does not meet the migration requirement of the xth key node; and if the hardware information of the xth key node does not conflict with the hardware information of the destination server, determine that the destination server meets the migration requirement of the xth key node.

Optionally, in some embodiments, the migration unit 603 is configured to: determine whether the computing resource of the destination server meets the migration requirement of the xth key node. If the computing resource of the destination server does not meet the migration requirement of the xth key node, the destination server does not meet the migration requirement of the xth key node; and if the computing resource of the destination server meets the migration requirement of the xth key node, the destination server meets the migration requirement of the xth key node.

Optionally, in some embodiments, the destination server is a server on which a reference function node corresponding to the xth key node is located or a server adjacent to the server on which the reference function node is located, where the reference function node and the xth key node are two function nodes in one of the M intervals.

Optionally, in some embodiments, the processing unit 602 is further configured to determine a topology diagram based on the N migration degrees and the connection relationship between the N intervals, where the topology diagram represents the connection relationship between the N intervals and a migration degree corresponding to each of the N intervals. The computer device further includes a displaying unit, configured to display the topology diagram.

For functions and beneficial effects of the obtaining unit 601, the processing unit 602, and the migration unit 603, please refer to the embodiment shown in FIG. 3. For brevity, details are not described herein again.

Figure 7:
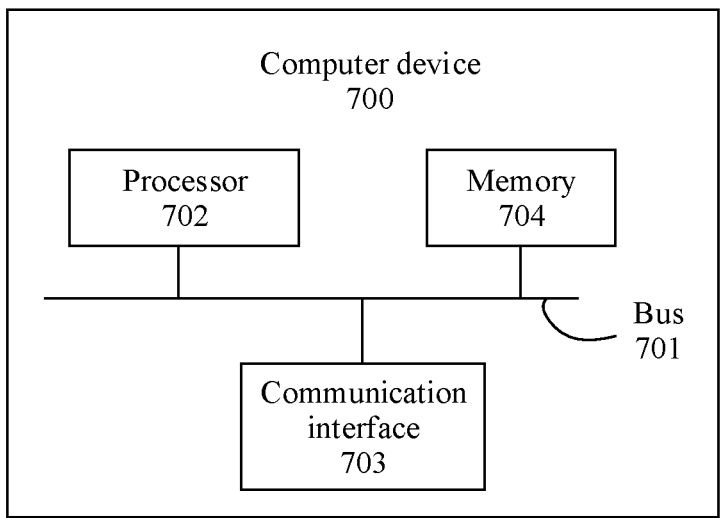
FIG. 7 is a schematic block diagram of a structure of a computer device according to an embodiment of this disclosure.

FIG. 7 is a schematic block diagram of a structure of a computer device according to an embodiment of this disclosure. A computer device 700 includes a bus 701, a processor 702, a communication interface 703, and a memory 704. The processor 702, the memory 704, and the communication interface 703 communicate with each other by using the bus 701. The processor 702 may be a field programmable gate array (FPGA), an application-specific integrated circuit (ASIC), system on chip (SoC), a CPU, a network processor (NP), a digital signal processor (DSP), a micro controller unit (MCU), a programmable logic device (PLD), another programmable logic device, a discrete gate or transistor logic device, a discrete hardware component, or another integrated chip. The memory 704 stores executable code included in the pathological image processing system, and the processor 702 reads the executable code in the memory 704 to perform the method shown in FIG. 3. The memory 704 may further include an operating system and other software modules required for running processes. The operating system may be Linux™, Unix™, Windows™, or the like.

An embodiment of this disclosure further provides a chip system, including a logic circuit. The logic circuit is configured to be coupled to an input/output interface, and perform data transmission through the input/output interface, to perform the method shown in FIG. 3.

In an implementation process, the steps in the foregoing method may be implemented by using a hardware integrated logical circuit in the processor, or by using an instruction in a form of software. The steps of the method disclosed with reference to this embodiment of this disclosure may be directly performed by a hardware processor, or may be performed by using a combination of hardware in the processor and a software module. A software module may be located in a mature storage medium in the art, such as a random-access memory (RAM), a flash memory, a read-only memory, a programmable read-only memory, an electrically erasable programmable memory, or a register. The storage medium is located in the memory, and the processor reads information in the memory and completes the steps of the foregoing method in combination with hardware of the processor. To avoid repetition, details are not described herein again.

It should be noted that, the processor in this embodiment of this disclosure may be an integrated circuit chip, and has a signal processing capability. In an implementation process, steps in the foregoing method embodiment may be completed by using an integrated logic circuit of hardware in the processor or by using an instruction in a form of software. The general-purpose processor may be a microprocessor, or the processor may be any processor or the like. The steps in the methods disclosed with reference to embodiments of this disclosure may be directly performed and completed by a hardware decoding processor, or may be performed and completed by using a combination of hardware in a decoding processor and a software module. A software module may be located in a mature storage medium in the art, such as a RAM, a flash memory, a read-only memory, a programmable read-only memory, an electrically erasable programmable memory, or a register. The storage medium is located in the memory, and the processor reads information in the memory and completes the steps of the foregoing method in combination with hardware of the processor.

It may be understood that the memory in embodiments of this disclosure may be a volatile memory or a nonvolatile memory, or may include both a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a RAM that is used as an external buffer. Through example but not limitative description, RAMs in many forms may be used, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchlink dynamic random-access memory (SLDRAM), and a RAMBUS direct random-access memory (RDRAM). It should be noted that the memory in the system and the method described in this specification is intended to include but is not limited to these memories and any memory of another proper type.

According to the method provided in embodiments of this disclosure, this disclosure further provides a computer program product, and the computer program product includes computer program code. When the computer program code is run on a computer, the computer is enabled to perform the method in the embodiment shown in FIG. 3.

According to the method provided in embodiments of this disclosure, this disclosure further provides a computer-readable medium, and the computer-readable medium stores program code. When the program code is run on a computer, the computer is enabled to perform the method in the embodiment shown in FIG. 3.

A person of ordinary skill in the art may be aware that, the units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solution. A person skilled in the art may use different methods to implement the described functions for each particular application, but it should not be considered that the implementation goes beyond the scope of this disclosure.

It may be clearly understood by persons skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in this disclosure, it should be understood that the disclosed system, apparatus and method may be implemented in other manners. For example, the described apparatus embodiment is merely illustrative. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electrical, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in embodiments of this disclosure may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solution of this disclosure essentially, or a part contributing to the technology, or a part of the technical solution may be implemented in a form of a software product. The computer software product is stored in a storage medium, and includes several instructions for instructing a computer device (which may be a personal computer, a server, or a network device) to perform all or some of the steps of the methods described in embodiments of this disclosure. The foregoing storage medium includes: any medium that can store program code, such as a Universal Serial Bus (USB) flash drive, a removable hard disk, a ROM, a RAM, a magnetic disk, or an optical disc.

The foregoing descriptions are merely implementations of this disclosure, but are not intended to limit the protection scope of this disclosure. Any variation or replacement readily figured out by a person skilled in the art within the technical scope disclosed in this disclosure shall fall within the protection scope of this disclosure. Therefore, the protection scope of this disclosure shall be subject to the protection scope of the claims.

What is claimed is:

1. A method implemented by a computer device, wherein the method comprises:

obtaining access related information of at least one call chain, wherein the at least one call chain comprises function nodes and N intervals among the functions nodes, wherein the access related information comprises a time delay of each of the N intervals and a quantity of interactions of each of the N intervals, wherein the quantity of interactions of each of the N intervals comprises an average quantity of interaction times in a plurality of statistical periods between two function nodes forming one interval, wherein each interaction time is counted when a first function node of the two function nodes sends a processing result to a second function node of the two function nodes, wherein statistics of the quantity of interaction times are periodically collected within predetermined time intervals that define the plurality of statistical periods, wherein the average quantity of interaction times is calculated across the plurality of statistical periods, and wherein N is a positive integer greater than or equal to 1; and migrating, based on the access related information, P key nodes from the function nodes, wherein P is a positive integer greater than or equal to 1.

2. The method of claim 1, further comprising:

determining, based on the access related information, N migration degrees, wherein the N migration degrees are in a one-to-one correspondence with the N intervals and are positively correlated with the time delay of each of the N intervals and the quantity of interactions;

determining, based on the N migration degrees, M intervals in the N intervals, wherein a first migration degree of any interval in the M intervals is greater than a second migration degree of any interval in the N intervals other than the M intervals; and determining, based on the M intervals, the P key nodes, wherein the P key nodes belong to the M intervals.

3. The method of claim 2, wherein determining the N migration degrees comprises:

determining a weight ($W_{ij}$) corresponding to a delay of an $N_{ij}^{th}$ interval in the N intervals, wherein the $N_{ij}^{th}$ interval is a $j^{th}$ interval of an $i^{th}$ call chain in the at least one call chain, wherein i and j are positive integers greater than or equal to 1, and wherein $N_{ij}$=1, 2, . . . , or N; and determining, based on the $W_{ij}$ and the average quantity of interaction times between function nodes in the $N_{ij}^{th}$ interval, an $N_{ij}^{th}$ migration degree in the N migration degrees.

4. The method of claim 2, wherein migrating the P key nodes comprises:

determining a destination server from a plurality of servers;

determining whether the destination server meets a migration requirement of an $x^{th}$ key node in the P key nodes, wherein x=1, . . . , or P;

migrating the $x^{th}$ key node to the destination server when the destination server meets the migration requirement; and determining another destination server from the plurality of servers when the destination server does not meet the migration requirement.

5. The method of claim 4, wherein determining whether the destination server meets the migration requirement comprises:

determining whether a function node running on the destination server is in an anti-affinity relationship with the $x^{th}$ key node;

determining that the destination server does not meet the migration requirement of the $x^{th}$ key node when the function node running on the destination server is in the anti-affinity relationship; and determining that the destination server meets the migration requirement of the $x^{th}$ key node when the function node running on the destination server is not in the anti-affinity relationship.

6. The method of claim 4, wherein determining whether the destination server meets the migration requirement comprises:

determining that the destination server does not meet the migration requirement of the $x^{th}$ key node when first hardware information of the $x^{th}$ key node conflicts with second hardware information of the destination server; and determining that the destination server meets the migration requirement of the $x^{th}$ key node when the first hardware information of the $x^{th}$ key node does not conflict with the second hardware information.

7. The method of claim 4, wherein determining whether the destination server meets the migration requirement comprises:

determining whether a computing resource of the destination server meets the migration requirement;

determining that the destination server does not meet the migration requirement when the computing resource does not meet the migration requirement; and determining that the destination server meets the migration requirement when the computing resource meets the migration requirement.

8. The method of claim 4, wherein the destination server is either a first server on which a reference function node corresponding to the $x^{th}$ key node is located or a second server adjacent to the first server, and wherein the reference function node and the $x^{th}$ key node are two function nodes in one of the M intervals.

9. The method of claim 2, further comprising determining, based on the N migration degrees and a connection relationship between the N intervals, a topology diagram, wherein the topology diagram represents the connection relationship and a migration degree corresponding to each of the N intervals.

10. A computer device, comprising:

a memory configured to store instructions; and a processor coupled to the memory and configured to execute the instructions to cause the computer device to:

obtain access related information of at least one call chain, wherein the at least one call chain comprises function nodes and N intervals among the function nodes, wherein the access related information comprises a time delay of each of the N intervals and a quantity of interactions of each of the N intervals, wherein the quantity of interactions of each of the N intervals comprises an average quantity of interaction times in a plurality of statistical periods between two function nodes forming one interval, wherein each interaction time is counted when a first function node of the two function nodes sends a processing result to a second function node of the two function nodes, wherein statistics of the quantity of interaction times are periodically collected within predetermined time intervals that define the plurality of statistical periods, wherein the average quantity of interaction times is calculated across the plurality of statistical periods, and wherein N is a positive integer greater than or equal to 1; and migrate, based on the access related information, P key nodes from the function nodes, wherein P is a positive integer greater than or equal to 1.

11. The computer device of claim 10, wherein the processor is further configured to execute the instructions to cause the computer device to:

determine, based on the access related information, N migration degrees, wherein the N migration degrees are in a one-to-one correspondence with the N intervals and are positively correlated with the time delay of each of the N intervals and the quantity of interactions;

determine, based on the N migration degrees, M intervals in the N intervals, wherein a first migration degree of any interval in the M intervals is greater than a second migration degree of any interval in the N intervals other than the M intervals; and determine, based on the M intervals, the P key nodes, wherein the P key nodes belong to the M intervals.

12. The computer device of claim 11, wherein the processor is further configured to execute the instructions to cause the computer device to:

determine a weight ($W_{ij}$) corresponding to a delay of an $N_{ij}^{th}$ interval in the N intervals, wherein the $N_{ij}^{th}$ interval is a $j^{th}$ interval of an $i^{th}$ call chain in the at least one call chain, wherein i and j are positive integers greater than or equal to 1, and wherein $N_{ij}=1, 2, \ldots ,$ or N; and determine, based on the $W_{ij}$ and the average quantity of interaction times between function nodes in the $N_{ij}^{th}$ interval, an $N_{ij}^{th}$ migration degree in the N migration degrees.

13. The computer device of claim 11, wherein the processor is further configured to execute the instructions to cause the computer device to:

determine a destination server from a plurality of servers;

determine whether the destination server meets a migration requirement of an $x^{th}$ key node in the P key nodes, wherein x=1, . . . , or P;

migrate the $x^{th}$ key node to the destination server when the destination server meets the migration requirement; and determine another destination server from the plurality of servers when the destination server does not meet the migration requirement.

14. The computer device of claim 13, wherein the processor is further configured to execute the instructions to cause the computer device to:

determine whether a function node running on the destination server is in an anti-affinity relationship with the $x^{th}$ key node;

determine that the destination server does not meet the migration requirement of the $x^{th}$ key node when the function node running on the destination server is in the anti-affinity relationship; and determine that the destination server meets the migration requirement of the $x^{th}$ key node when the function node running on the destination server is not in the anti-affinity relationship.

15. The computer device of claim 13, wherein the processor is further configured to execute the instructions to cause the computer device to:

determine that the destination server does not meet the migration requirement of the $x^{th}$ key node when first hardware information of the $x^{th}$ key node conflicts with second hardware information of the destination server; and determine that the destination server meets the migration requirement of the $x^{th}$ key node when the first hardware information of the $x^{th}$ key node does not conflict with the second hardware information.

16. The computer device of claim 13, wherein the processor is further configured to execute the instructions to cause the computer device to:

determine whether a computing resource of the destination server meets the migration requirement;

determine that the destination server does not meet the migration requirement when the computing resource does not meet the migration requirement; and determine that the destination server meets the migration requirement when the computing resource meets the migration requirement.

17. The computer device of claim 13, wherein the destination server is either a first server on which a reference function node corresponding to the $x^{th}$ key node is located or a second server adjacent to the first server, and wherein the reference function node and the $x^{th}$ key node are two function nodes in one of the M intervals.

18. The computer device of claim 11, wherein the processor is further configured to execute the instructions to cause the computer device to determine, based on the N migration degrees and a connection relationship between the N intervals, a topology diagram, wherein the topology diagram represents the connection relationship and a migration degree corresponding to each of the N intervals, and wherein the computer device further comprises a display configured to display the topology diagram.

19. A computer program product comprising instructions stored on a non-transitory computer-readable medium that, when executed by a processor, cause a computer device to:

obtain access related information of at least one call chain, wherein the at least one call chain comprises function nodes and N intervals among the functions nodes, wherein the access related information comprises a time delay of each of the N intervals and a quantity of interactions of each of the N intervals, wherein the quantity of interactions of each of the N intervals comprises an average quantity of interaction times in a plurality of statistical periods between two function nodes forming one interval, wherein each interaction time is counted when a first function node of the two function nodes sends a processing result to a second function node of the two function nodes, wherein statistics of the quantity of interaction times are periodically collected within predetermined time intervals that define the plurality of statistical periods, wherein the average quantity of interaction times is calculated across the plurality of statistical periods, and wherein N is a positive integer greater than or equal to 1; and migrate, based on the access related information, P key nodes from the function nodes, wherein P is a positive integer greater than or equal to 1.

20. The computer program product of claim 19, wherein the instructions further cause the computer device to:

determine, based on the access related information, N migration degrees, wherein the N migration degrees are in a one-to-one correspondence with the N intervals and are positively correlated with the time delay of each of the N intervals and the quantity of interactions;

determine, based on the N migration degrees, M intervals in the N intervals, wherein a first migration degree of any interval in the M intervals is greater than a second migration degree of any interval in the N intervals other than the M intervals; and determine, based on the M intervals, the P key nodes, wherein the P key nodes belong to the M intervals.

* * * * *